(12) United States Patent
Seki et al.

(10) Patent No.: US 7,416,765 B2
(45) Date of Patent: Aug. 26, 2008

(54) POLYMERIZABLE LIQUID CRYSTALLINE COMPOSITION AND LIQUID CRYSTAL FILM MADE FROM THE COMPOSITION

(75) Inventors: Takashi Seki, Yokohama (JP); Tooru Nakamura, Yokohama (JP); Hitoshi Mazaki, Yokohama (JP)

(73) Assignee: Nippon Oil Corporation, Tokyo (JP)

( * ) Notice: Subject to any disclaimer, the term of this patent is extended or adjusted under 35 U.S.C. 154(b) by 0 days.

(21) Appl. No.: 11/688,548

(22) Filed: Mar. 20, 2007

(65) Prior Publication Data

US 2007/0164255 A1  Jul. 19, 2007

Related U.S. Application Data

(63) Continuation of application No. PCT/JP2005/013531, filed on Jul. 15, 2005.

(30) Foreign Application Priority Data

Oct. 4, 2004   (JP) .............................. 2004-291995

(51) Int. Cl.
*C09K 19/38* (2006.01)
*C09K 19/30* (2006.01)
*C09K 19/32* (2006.01)
*C09K 19/34* (2006.01)
*C09K 19/12* (2006.01)
*C09K 19/20* (2006.01)
*C09K 19/36* (2006.01)

(52) U.S. Cl. ................. 428/1.1; 252/299.01; 252/299.5; 252/299.61; 252/299.62; 252/299.63; 252/299.64; 252/299.65; 252/299.66; 252/299.67; 252/299.7; 428/1.3; 428/1.33

(58) Field of Classification Search .................. 428/1.1, 428/1.3, 1.33; 252/299.01, 299.61, 299.62, 252/299.63, 299.64, 299.65, 299.66, 299.67, 252/299.7

See application file for complete search history.

(56) References Cited

U.S. PATENT DOCUMENTS

| 7,070,711 B2 * | 7/2006 | Seki et al. ............... 252/299.61 |
| 7,125,590 B2 * | 10/2006 | Matsumoto et al. .......... 428/1.3 |
| 7,244,798 B2 * | 7/2007 | Matsumoto et al. ......... 526/319 |

FOREIGN PATENT DOCUMENTS

| JP | 04-057017 A | 2/1992 |
| JP | 05-333313 A | 12/1993 |
| JP | 09-003454 A | 1/1997 |
| JP | 11-080081 A | 3/1999 |
| JP | 11-158258 A | 6/1999 |
| JP | 2001-172631 A | 6/2001 |
| JP | 2001-323266 A | 11/2001 |
| JP | 2003-287621 A | 10/2003 |
| JP | 2004-123882 A | 4/2004 |

* cited by examiner

*Primary Examiner*—Shean C Wu
(74) *Attorney, Agent, or Firm*—Panitch Schwarze Belisario & Nadel LLP

(57) ABSTRACT

A polymerizable liquid crystalline composition comprises a side chain liquid crystalline polymer obtained by radical-copolymerizing a (meth)acrylic compound has an optically active site and a (meth)acrylic compound having an oxetanyl group, and a cation generator and thus have no functional group the synthesis of which is difficult, such as an epoxy group. The use of the polymerizable liquid crystalline composition provides a cholesteric liquid crystal film which is excellent in a capability of retaining the orientation after being aligned and fixed in a liquid crystal orientation and in mechanical strength without the necessity of a complicated operation such as photo irradiation under an inert gas atmosphere.

8 Claims, No Drawings

POLYMERIZABLE LIQUID CRYSTALLINE COMPOSITION AND LIQUID CRYSTAL FILM MADE FROM THE COMPOSITION

CROSS-REFERENCE TO RELATED APPLICATIONS

This application is a Continuation of International Application No. PCT/JP2005/013531, filed Jul. 15, 2005, which was published in the Japanese language on Apr. 13, 2006, under International Publication No. WO 2006/038364 A1 and the disclosure of which is incorporated herein by reference.

FIELD OF THE INVENTION

The present invention relates to polymerizable liquid crystalline compositions and liquid crystal films made from the same.

BACKGROUND OF THE INVENTION

In recent years, studies and developments have been actively carried out to utilize liquid crystalline compounds as optical materials, and many of them have already been put in practical use. When a liquid crystalline compound is used as an optical material, it is necessary to retain the compound in its liquid crystal structure having been aligned and fixed, under practical service conditions. Various methods for fixing the liquid crystal structure have been proposed, such as those wherein polymerizable liquid crystalline compounds are used, wherein polymeric liquid crystalline compounds are used, and wherein polymeric liquid crystalline compounds having a crosslinkable reactive group are used.

In one of the methods wherein polymeric liquid crystalline compounds having a crosslinkable reactive group are used, there is used a polymerizable liquid crystalline compound comprising a mesogen composed of two or more benzene rings or similar rings, spacers each composed of a hydrocarbon chain, and radically polymerizable reactive groups such as (meth)acrylate groups located at both or one of the terminal ends (see, for example, Patent Document 1 below). In this method, such a polymerizable liquid crystalline compound is applied after being heat-melted or in the form of a solution, on an alignment substrate and if necessary dried so as to be formed into a liquid crystal layer thereon, which layer is then heated to be aligned in a liquid crystal state and polymerized by photo irradiation to fix the layer in the aligned state. However, this method is required to inhibit the inhibition of polymerization caused by oxygen in the air, leading to the necessity of complicated operations such as photo irradiation under inert gas atmosphere and improvements in facilities and devices therefor. It is also necessary to pay meticulous care upon synthesis of the polymerizable liquid crystalline compound because the (meth)acrylate group is likely to be polymerized with light or heat.

As the method using a polymeric liquid crystalline compound, it is proposed to use a liquid crystalline polyester with excellent properties to retain the liquid crystal orientation (see, for example, Patent Document 2 below). However, as a result of the widespread of mobile devices, an optical film comprised of such a liquid crystalline polyester has been demanded to have properties to retain the liquid crystal orientation under more sever practical use conditions and more excellent mechanical strength as well.

As the method using a polymeric liquid crystalline substance having a polymerizable reactive group, there have been proposed a method wherein a polymerizable reactive group is introduced into the polymeric main chain and a method wherein monomer units having a polymerizable reactive group are introduced into the side chains. However, since in either of these methods the liquid crystallinity of the material used is decreased, there is a limit to the amount of the polymerizable group to be introduced to enhance the sufficient mechanical strength. Therefore, alternative methods have been demanded.

(1) Japanese Patent Laid-Open Publication No. 11-80081
(2) Japanese Patent Laid-Open Publication No. 11-158258
(3) Japanese Patent Laid-Open Publication No. 9-3454

DISCLOSURE OF THE INVENTION

The present invention has an object to provide a polymerizable liquid crystalline compound containing no functional group, the synthesis of which is difficult and also a cholesteric liquid crystal film produced from the compound, which requires no complicated operation such as photo irradiation under inert gas atmosphere and has an excellent capability to retain the liquid crystal orientation after having been aligned and fixed and excellent mechanical strength.

After extensive researched and studies of a polymerizable liquid crystalline compound which can be easily synthesized and has an excellent liquid crystal alignability, the inventors of the present invention found a polymerizable liquid crystalline composition having a cationic polymerizable oxetanyl group as a polymerizable reactive group. As the result, they also found that the polymerizable liquid crystalline compound was aligned in a liquid crystal state and polymerized so as to be formed into a film thereby being able to develop a novel cholesteric liquid crystal film with an excellent ability to retain the aligned liquid crystal state after being fixed in an aligned liquid crystal phase and an excellent mechanical strength.

That is, according to a first aspect of the present invention, there is provided a polymerizable liquid crystalline composition comprising: (I) a side chain liquid crystalline polymer produced by radical-copolymerizing (A) a (meth)acrylic compound having an optically active portion, represented by formula (1) below and (B) a (meth)acrylic compound having an oxetanyl group represented by formula (2) below; and (II) a photo cation generator and/or a thermal cation generator, the weight ratio of Compound (A) to Compound (B) in the side chain liquid crystalline polymer (I) being within the range of 1:99 to 99:1:

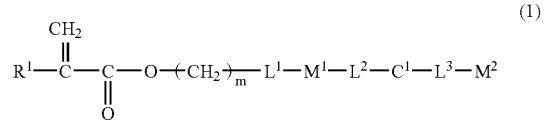
(1)

wherein $R^1$ is hydrogen or methyl, $C^1$ is an optically active site, $L^1$, $L^2$, and $L^3$ are each independently a single bond, —O—, —O—CO—, or —CO—O—, $M^1$ is represented by formula (3), (4), or (5) below, $M^2$ is represented by formula (6), (7), or (8) below, and m is an integer of 0 to 10, $$—P^1\text{-}L^4\text{-}P^2\text{-}L^5\text{-}P^3— \tag{3}$$

$$—P^1\text{-}L^4\text{-}P^2— \tag{4}$$

$$—P^1— \tag{5}$$

$$—P^4\text{-}L^6\text{-}P^5\text{-}L^7\text{-}P^6 \tag{6}$$

—P⁴-L⁶-P⁶  (7)

—P⁶  (8)

wherein P¹, P², P³, P⁴, and P⁵ are each independently a group selected from those represented by formulas (9) below, P⁶ is a group selected from those represented by formulas (10) below, and L⁴, L⁵, L⁶, and L⁷ are each independently a single bond, —CH=CH—, —C≡C—, —O—, —O—CO— or —CO—O—,

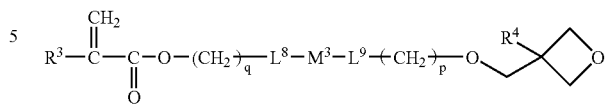

(2)

wherein $R^3$ is hydrogen or methyl, $R^4$ is hydrogen, methyl or ethyl, $L^8$ and $L^9$ are each independently a single bond, —O—, —O—CO—, or —CO—O—, $M^3$ is represented by formula (11), (12) or (13) below, and p and q are each independently an integer of 0 to 10,

—P⁷-L¹⁰-P⁸-L¹¹-P⁹—  (11)

—P⁷-L¹⁰-P⁸—  (12)

—P⁷—  (13)

wherein $P^7$, $P^8$ and $P^9$ are each independently a group selected from those represented by formulas (14), and $L^{10}$ and $L^{11}$ are each independently a single bond, —CH=CH—, —C≡C—, —O—, —O—CO— or —CO—O—,

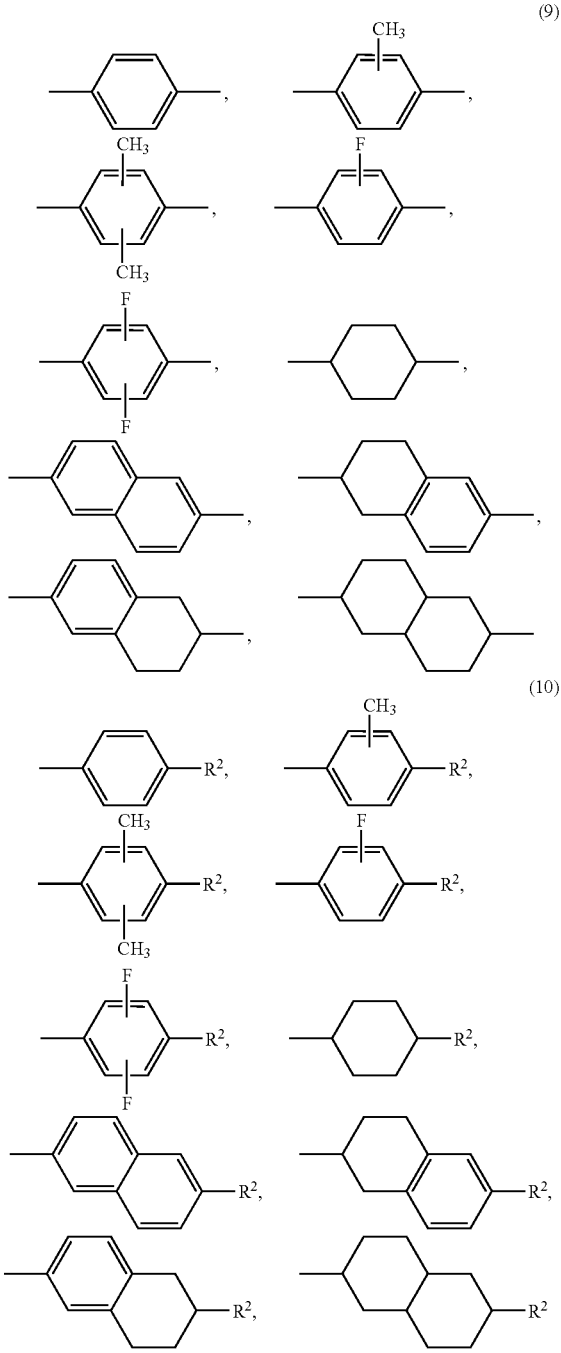

wherein $R^2$ is hydrogen, an alkyl or alkyloxy group having 1 to 20 carbon atoms, a halogen, or a cyano group;

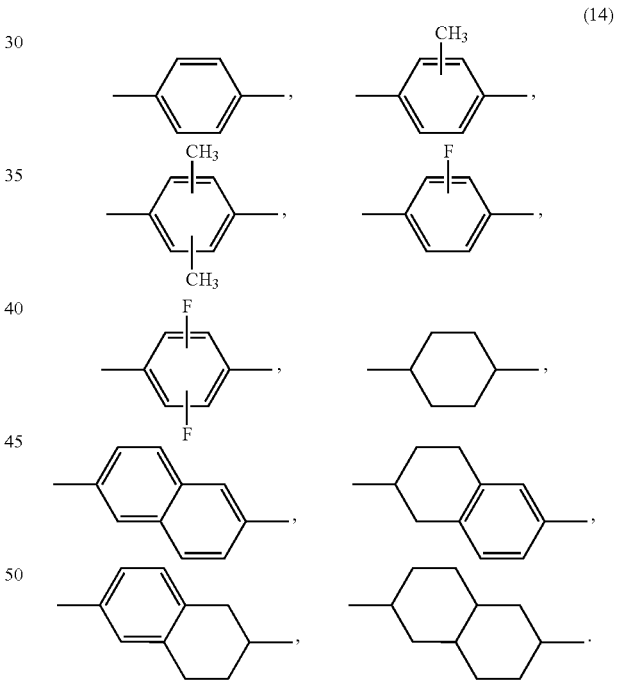

According to a second aspect of the present invention, there is provided a polymerizable liquid crystalline composition comprising: (III) a side chain liquid crystalline polymer produced by radical-copolymerizing (D) a (meth)acrylic compound having an optically active site, represented by formula (15) below and (E) a (meth)acrylic compound having an oxetanyl group, represented by formula (16) below; and (IV) a photo cation generator and/or a thermal cation generator, the weight ratio of Compound (D) to Compound (E) in the side chain liquid crystalline polymer (III) being within the range of 1:99 to 99:1, (15)

R⁵—C(=CH₂)—C(=O)—O—(CH₂)ₙ—L¹²—M⁴—L¹³—C² wherein R⁵ is hydrogen or methyl, C² is an optically active site, L¹² and L¹³ are each independently a single bond, —O—, —O—CO—, or —CO—O—, M⁴ is represented by formula (17), (18) or (19) below, and n is an integer of 0 to 10, $$-P^{10}-L^{14}-P^{11}-L^{15}-P^{12}- \quad (17)$$

$$-P^{10}-L^{14}-P^{11}- \quad (18)$$

$$-P^{10}- \quad (19)$$

wherein $P^{10}$, $P^{11}$, and $P^{12}$ are each independently a group selected from those represented by formulas (20) below, and $L^{14}$ and $L^{15}$ are each independently a single bond, —CH=CH—, —C≡C—, —O—, —O—CO— or —CO—O—, (20)

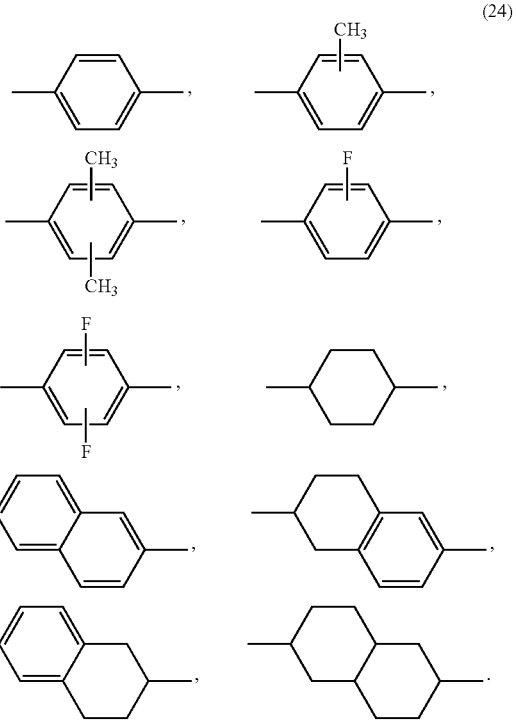

(16)

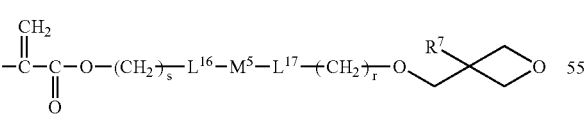

wherein R⁶ is hydrogen or methyl, R⁷ is hydrogen, methyl, or ethyl, L¹⁶ and L¹⁷ are each independently a single bond, —O—, —O—CO—, or —CO—O—, M⁵ is represented by formula (21), (22) or (23), and r and s are each independently an integer of 0 to 10, $$-P^{13}-L^{18}-P^{14}-L^{19}-P^{15}- \quad (21)$$

$$-P^{13}-L^{18}-P^{14}- \quad (22)$$

$$-P^{13}- \quad (23)$$

wherein $P^{13}$, $P^{14}$, and $P^{15}$ are each independently a group selected from those represented by formulas (24) below, and $L^{18}$ and L19 are each independently a single bond, —CH=CH—, —C≡C—, —O—, —O—CO— or —CO—O—, (24)

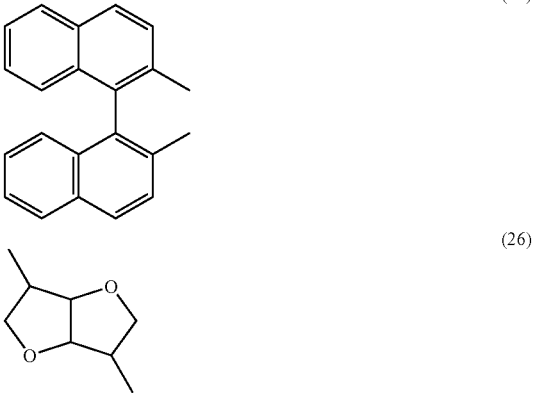

According to a third aspect of the present invention, there is provided the polymerizable liquid crystalline composition according to the first aspect, wherein C¹ in formula (1) is a group represented by any one of formula (25), (26), (27), (28), or (29):

(25)

(26)

(27)

-continued

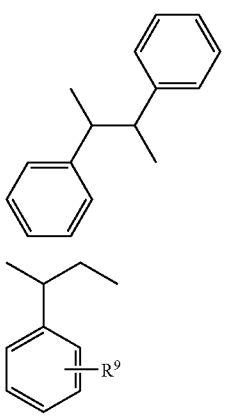

(28)

(29)

wherein $R^9$ is hydrogen, an alkyl or alkyloxy group having 1 to 20 carbon atoms, a halogen, or a cyano group.

According to a fourth aspect of the present invention, there is provided the polymerizable liquid crystalline composition according to the second aspect, wherein $C^2$ in formula (15) is a group represented by any one of formula (30), (31), (32), (33), or (34) below:

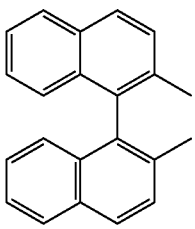

(30)

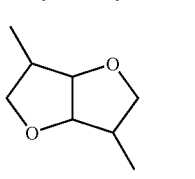

(31)

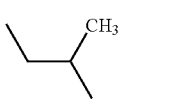

(32)

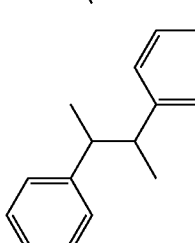

(33)

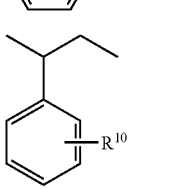

(34)

Wherein $R^{10}$ is hydrogen, an alkyl or alkyloxy group having 1 to 20 carbon atoms, a halogen, or a cyano group.

According to a fifth aspect of the present invention, there is provided a liquid crystal film comprising a layer of the polymerizable liquid crystalline composition according to the first or third aspect, formed on an alignment film so as to align cholesterically and fix the molecules, the layer being polymerized with light and/or heat.

According to a sixth aspect of the present invention, there is provided a liquid crystal film comprising a layer of the polymerizable liquid crystalline composition according to the second or fourth aspect, formed on an alignment film so as to align cholesterically and fix the molecules, the layer being polymerized with light and/or heat.

The present invention will be described in more detail below.

The polymerizable liquid crystalline composition of the first aspect of the present invention comprises (I) a side chain liquid crystalline polymer produced by radical-copolymerizing (A) a (meth)acrylic compound having an optically active site, represented by formula (1), (B) a (meth)acrylic compound having an oxetanyl group represented by formula (2) and if necessary (C) other (meth)acrylic compound and (II) a photo cation generator and/or a thermal cation generator.

The polymerizable liquid crystalline composition of the second aspect of the present invention comprises (III) a side chain liquid crystalline polymer produced by radical-copolymerizing (D) a (meth)acrylic compound having an optically active site, represented by formula (15), (E) a (meth)acrylic compound having an oxetanyl group represented by formula (16) and if necessary (F) other (meth)acrylic compound and (IV) a photo cation generator and/or a thermal cation generator.

The spacers represented by "—$(CH_2)_m$—" in formula (1) and "—$(CH_2)_n$—" in formula (15) are each a single bond wherein m in formula (1) is 0 or n in formula (15) is 0, or a divalent straight-chain hydrocarbon group having 1 to 10 carbon atoms. Since a too long spacer would generally cause the degradation of heat resistance of the resulting film after being cured, the carbon number of the spacer is preferably from 0 to 6.

The side chain liquid crystalline polymer (I) of the first aspect of the present invention is produced by radical-copolymerizing (A) a (meth) acrylic compound having an optically active site represented by formula (1), (B) a (meth) acrylic compound having an oxetanyl group represented by formula (2) and if necessary (C) other (meth)acrylic compound.

The side chain liquid crystalline polymer (III) of the second aspect of the present invention is produced by radical-copolymerizing (D) a (meth)acrylic compound having an optically active site represented by formula (15), (E) a (meth) acrylic compound having an oxetanyl group represented by formula (16) and if necessary (F) other (meth)acrylic compound.

There is no particular restriction on the (meth)acrylic compound (C) or (F) added for copolymerization if necessary. However, the (meth)acrylic compound (C) or (F) is preferably a (meth) acrylic compound having a mesogen group with the objective of enhancing the liquid crystallinity of the polymer to be synthesized. Specific particularly preferred examples include those represented by the following formulas:

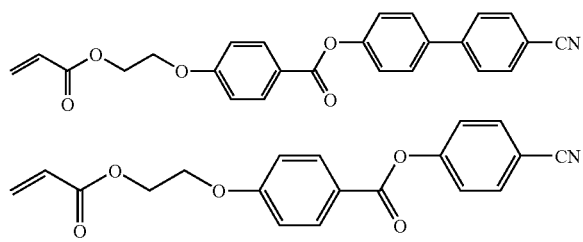

There is no particular restriction on the polymerization conditions. Therefore, the polymerization may be carried out under ordinary conditions. For example, a method may be used wherein the (meth)acrylic compounds (A) to (C) or (D) to (F) are dissolved in a solvent such as dimethylformamide (DMF) and reacted at a temperature of 80 to 90° C. for several hours using 2,2'-azobisisobutylonitrile (AIBN) or benzoyl peroxide (BPO) as an initiator. Alternatively, in order to allow the liquid crystal phase to be stably exhibited there is an effective method in which living radical polymerization is conducted using an initiator such as a copper (II) bromide/2, 2'-bipyridyl-based initiator or a 2,2,6,6-tetramethylpiperidinyloxy free radical (TEMPO)-based initiator so as to control the molecular weight distribution. These radical polymerizations are necessarily conducted strictly under deoxidation conditions.

The molar ratio of the (meth)acrylic compound (A) to the (meth)acrylic compound (B) in the side chain liquid crystalline polymer (I) of the first aspect of the present invention is from 1:99 to 99:1 and preferably from 2:98 to 50:50.

When the compound (C) is added, the molar ratio of the compound (A) to (the compounds (B)+(C)) is from 1:99 to 99:1 and preferably from 2:98 to 50:50 while the molar ratio of the compound (B) to (the compounds (A)+(C)) is from 1:99 to 99:1 and preferably from 2:98 to 50:50.

The molar ratio of the (meth) acrylic compound (D) to the (meth)acrylic compound (E) in the side chain liquid crystalline polymer (III) of the second aspect of the present invention is from 1:99 to 99:1 and preferably from 2:98 to 50:50.

When the compound (F) is added, the molar ratio of the compound (D) to (the compounds (E)+(F)) is from 1:99 to 99:1 and preferably from 2:98 to 50:50 while the molar ratio of the compound (E) to (the compounds (D)+(F)) is from 1:99 to 99:1 and preferably from 2:98 to 50:50.

The side chain liquid crystalline polymers (I) and (III) of the first and second aspects of the present invention have a weight-average molecular weight of preferably 2,000 to 100,000 and particularly preferably 5,000 to 50,000.

The components (II) and (IV) of the polymerizable liquid crystalline compositions according to the first and second aspects of the present invention are each a photo cation generator and/or a thermal cation generator.

Since the polymerizable liquid crystalline compositions of the present invention comprise a compound having a cationically polymerizable oxetanyl group, a cation generator for polymerizing (curing) the compound is required. Preferred cation generators are compounds capable of generating cations by applying an external stimulus such as light and/or heat, such as those having a trichloromethyl or quinonediazido group and organic sulfonium salt-, iodonium salt-, or phosphonium salt-based compounds. If necessary, various sensitizers may be used in combination.

The term "photo cation generator" used herein denotes a compound which can generate cations by irradiating a light with a specific wavelength and may be any of organic sulfonium salt-, iodonium salt-, or phosphonium salt-based compounds. Counter ions of these compounds are preferably antimonate, phosphate, and borate. Specific examples include $Ar_3S^+SbF_6^-$, $Ar_3P^+BF_4^-$, and $Ar_2I^+PF_6^-$ wherein Ar indicates a phenyl or substituted phenyl group. Sulfonic acid esters, triazines, diazomethanes, β-ketosulfones, iminosulfonates, and benzoinsulfonates may also be used.

The term "thermal cation generator" used herein denotes a compound which can generate cations by being heated to a certain temperature and may be any of benzylsulfonium salts, benzylammonium salts, benzylpyridinium salts, benzylphosphonium salts, hydrazinium salts, carbonic acid esters, sulfonic acid esters, amineimides, antimony pentachloride-acetyl chloride complexes, diaryliodonium salt-dibenzyloxy coppers, and halogenated boron-tertiary amine adducts.

Since the amount of the cation generator to be added in the polymerizable liquid crystalline composition varies depending on the structures of the mesogen portion or spacer portions constituting the side chain liquid crystalline polymer to be used, the equivalent weight of the oxetanyl group, and the conditions for aligning the composition in a liquid crystal state, it can not be determined with certainty. However, it is within the range of usually 100 ppm by mass to 20 percent by mass, preferably 1,000 ppm by mass to 10 percent by mass, more preferably 0.2 percent by mass to 7 percent by mass, and most preferably 0.5 percent by mass to 5 percent by mass. The amount of the cation generator of less than 100 ppm by mass is not preferable because polymerization may not progress due to the insufficient amount of cation to be generated. The amount of the cation generator of more than 20 percent by mass is not also preferable because a large amount of the undecomposed residue of the cation generator remains in the resulting liquid crystal film and thus the light resistance thereof would be degraded.

The polymerizable liquid crystalline composition having an oxetanyl group of the present invention can be easily aligned at low temperatures. Thereafter, the composition is cationically polymerized to polymerize the oxetanyl group, resulting in crosslinking thereby producing a liquid crystal film with a fixed aligned structure and an excellent heat resistance.

Therefore, a layer of the polymerizable liquid crystalline composition of the present invention is formed on a film with alignability so as to align and fix the molecules in a cholesteric state and thereafter polymerized with light and/or heat thereby producing a liquid crystal film with an excellent heat resistance.

Next, described is a method of producing a liquid crystal film using the polymerizable liquid crystalline composition of the present invention. Although not restricted, the method of producing a liquid crystal film preferably goes through each of the steps included in the method described below.

A liquid crystal film made from the polymerizable liquid crystalline composition of the present invention may be in any form such as one wherein a liquid crystal film is kept on an alignment substrate, i.e., (alignment substrate/(alignment layer)/liquid crystal film); one wherein a liquid crystal film is transferred to a transparent substrate film other than an alignment substrate, i.e., (transparent substrate film/liquid crystal film); or one wherein a liquid crystal film is used as a single layer (liquid crystal film only) when it has a self-standing property.

Examples of the alignment substrates which can be used in the present invention include films of such as polyimide, polyamide, polyamideimide, polyphenylene sulfide, polyphenylene oxide, polyether ketone, polyetherether ketone, polyether sulfone, polysulfone, polyethylene terephthalate, polyethylene naphthalate, polyarylate, triacetyl cellulose, epoxy resins, and phenol resins, polyvinyl alcohols, and uniaxially stretched films thereof.

Some of these films exhibit a sufficient alignability for the polymerizable liquid crystalline composition of the present invention depending on the method of producing the films even though they are not subjected to an aligning treatment. However, if a film does not have alignability sufficiently or at all, the film may be stretched by an appropriate heating treatment; subjected to a rubbing treatment wherein the film is rubbed in one direction with a rayon cloth, a conductive nylon, cotton, or an acrylic resin or wherein the film is rubbed after a conventional alignment layer of polyimide, polyvinyl alcohol, or a silane coupling agent is formed over the film; an oblique vapor deposition with silicon oxide; or subjected to the combination of these treatments to be provided with alignability. Alternatively, the alignment substrate may be a metal plates of aluminum, iron, or copper and any of various glass plates on which surfaces fine grooves are regularly formed.

In the case where an alignment substrate is not optically isotropic or makes the resulting liquid crystal film opaque at a wavelength region where the film is intended to be used, the liquid crystal film may be transferred from such an alignment substrate to an optically isotropic film or a substrate which is transparent at a wavelength region where the liquid crystal film is intended to be used. Examples of the method of transferring include those as disclosed in Japanese Patent Laid-Open Publication Nos. 4-57017 and 5-333313 wherein after a liquid crystal film layer on an alignment substrate is laminated via a tacky adhesive or adhesive over a transparent substrate which is different from the alignment substrate and if necessary the adhesive is cured, only the liquid crystal film is transferred to the transparent substrate by peeling off the alignment substrate from the laminate.

Examples of the transparent substrate onto which the liquid crystal layer is transferred include triacetyl cellulose films such as Fujitac (manufactured by Fuji Photo Film Co., Ltd.) and Konicatac (manufactured by Konica Corp.); TPX film (manufactured by Mitsui Chemical Inc.); Arton film (manufactured by JSR); Zeonex film (manufactured by Zeon Corp.); and Acryplene film (manufactured by Mitsubishi Rayon Co., Ltd.). If necessary, a polarizer may be used as a transparent substrate. Alternatively, a quartz plate or a glass plate may be used. A polarizer may be used regardless of whether or not a protective layer is used.

There is no particular restriction on the tacky adhesive or adhesive to be used to transfer the liquid crystal film as long as it is of optical grade. Therefore, there may be used conventional acrylic-, epoxy resin-, ethylene-vinyl acetate copolymer-, rubber-, urethane-based ones, mixture types thereof, or various reactive ones of such as thermal curing type and/or photo curing type or electron radiation curing types.

The reaction conditions under which the reactive tacky adhesives or adhesives are cured vary depending on their formulation, viscosity and reaction temperature thereof. Therefore, the curing may be conducted under the conditions properly selected. For example, photo-curing type adhesives may be cured at a similar irradiation dose using a similar light source to those used for a photo cation generator described hereinafter. Electron radiation curing type adhesives may be cured at an accelerating voltage of usually 25 kV to 200 kV and preferably 50 kV to 100 kV.

The liquid crystal film may be produced by a method wherein a polymerizable liquid crystalline composition in a molten state or in the form of a solution is coated over an alignment substrate. The coated layer on the alignment layer is dried, heated for aligning it in a liquid crystal orientation, and subjected to a photo irradiation and/or a heat treatment (polymerization) thereby being formed into the liquid crystal film.

There is no particular restriction on the solvent used for preparing a solution of the polymerizable liquid crystalline composition of the present invention as long as it can dissolve the components constituting the composition and be evaporated under appropriate conditions. Preferred examples of the solvent include ketones such as acetone, methyl ethyl ketone, and isophorone; ether alcohols such as butoxy ethyl alcohol, hexyloxy ethyl alcohol, and methoxy-2-propanol; glycol ethers such as ethylene glycol dimethylether and diethylene glycol dimethyl ether; ester-based solvents such as ethyl acetate, methoxypropyl acetate and ethyl lactate; phenol-based solvents such as phenol and chlorophenol; amide-based solvents such as N,N-dimethylformamide, N,N-dimethylacetoamide, and N-methylpyrrolidone; halogenated hydrocarbon-based solvents such as chloroform, tetrachloroethane, and dichlorobenzene; and mixtures thereof. Surfactants, defoaming agents, or leveling agents may be added to the solution so as to form a uniform film layer on an alignment substrate. Furthermore, for the purpose of coloring, dichroic dyes, dyes, or pigments may be added to an extent that the exhibition of liquid crystallinity is not inhibited.

There is no particular restriction on the method of coating the polymerizable liquid crystalline composition of the present invention as long as the uniformity of the film layer can be maintained. Therefore, there may be used any conventional method such as roll coating, die coating, dip coating, curtain coating, or spin coating methods. The coating may be followed by a solvent-removing process, i.e., drying using a heater or a hot air blowing.

Thereafter, if necessary, a heat treatment is conducted so as to form the coating in a cholesterically aligned liquid crystal state. In this heat treatment, the polymerizable liquid crystalline composition used is heated to the range of temperatures at which the composition exhibits a liquid crystal phase, so as to align the composition cholesterically by its self-alignability. Since the conditions for the heat treatment vary in optimum conditions and limits depending on the liquid crystal phase behavior temperature (transition temperature) of the polymerizable liquid crystalline composition to be used, it can not be determined with certainty. However, the heat treatment is conducted at a temperature within the range of usually 10 to 200° C. and preferably 20 to 150° C. Too low temperatures are not preferable because there is a possibility that the composition may not be aligned in a liquid crystal state sufficiently, while too high temperatures are not also preferable because the alignability of an alignment film substrate may be adversely affected. The heat treatment is conducted for usually 3 seconds to 30 minutes and preferably 10 seconds to 10 minutes. The heat treatment for shorter than 3 seconds is not preferable because there is a possibility that the composition may not be aligned in a liquid crystal phase completely. Whereas, the heat treatment for longer than 30 minutes is not also preferable because the productivity is extremely deteriorated. After the liquid crystalline composition is completely aligned in a liquid crystal state by heat treatment or the like, the composition on the alignment substrate is polymerized (cured) by photo irradiation and/or heat treatment as it is. In the present invention, the polymerization (curing) process is conducted so as to modify the polymerizable liquid crystalline composition to be a harder film layer by fixing the completely aligned liquid crystal state.

No particular limitation is imposed on the thickness of the liquid crystal film fixed in a cholesterically aligned state produced by any of the above-described methods. The thickness is generally from 0.3 to 20 μm, preferably from 0.5 to 10 μm, and more preferably from 0.7 to 3 μm in view of mass-productivity and manufacturing process.

APPLICABILITY IN THE INDUSTRY

The present invention provides a polymerizable liquid crystalline compound which can be easily synthesized and the use of which makes it possible to produce a liquid crystal film with an excellent capability to retain the aligned orientation after the compound is aligned and fixed in a liquid crystal orientation and excellent mechanical strength without carrying out complicated operations.

Since the liquid crystal film of the present invention has a cholesteric liquid crystallinity and exhibits beautiful color when its selective reflection wavelength region is in a visible light region, it is not only applicable to the field of optics and photo-electronics but also useful as ornamental articles and accessories. Furthermore, the liquid crystal film can exhibit excellent properties when it is used as any of pigments, color polarizers, luminance improving films, compensation films for liquid crystal display devices of such as VA and TN modes, and forgery preventing films.

BEST MODES FOR CARRYING OUT THE PRESENT INVENTION

The present invention will be further described in the following examples, but should not be construed as being limited thereto.

The measurement of the transmission spectrum used in the examples was conducted using V-570 manufactured by JASCO Corporation.

SYNTHESIS EXAMPLE 1

In accordance with Scheme 1 below, an acrylic compound having an optically active site (1) was synthesized using 4-cyano-benzoic acid (manufactured by Tokyo Kasei Kogyo Co., Ltd.) and isosorbide (manufactured by Tokyo Kasei Kogyo Co., Ltd.) as the starting materials. The resulting compound was refined in a hexane/ethyl acetate solvent with a silica gel chromatography.

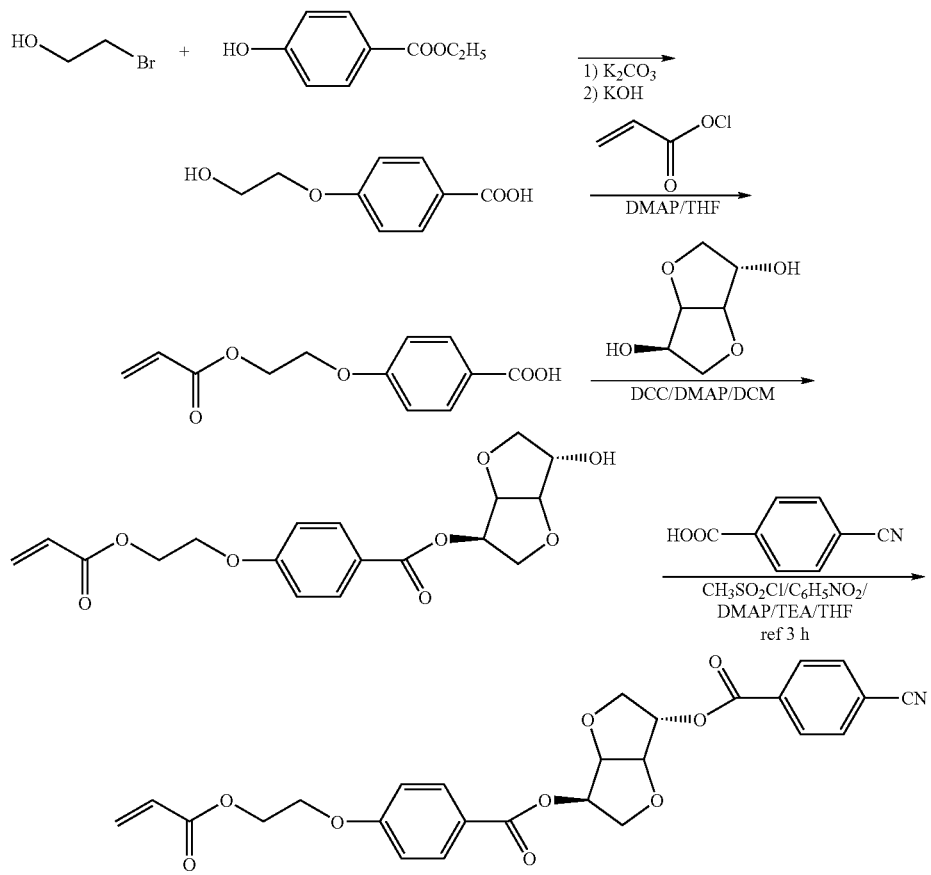

Acrylic Compound Having an Optically Active Site (1)

SYNTHESIS EXAMPLE 2

In accordance with Scheme 2 below, an acrylic compound having an optically active site (2) was synthesized. The resulting compound was refined in a hexane/ethyl acetate solvent with a silica gel chromatography.

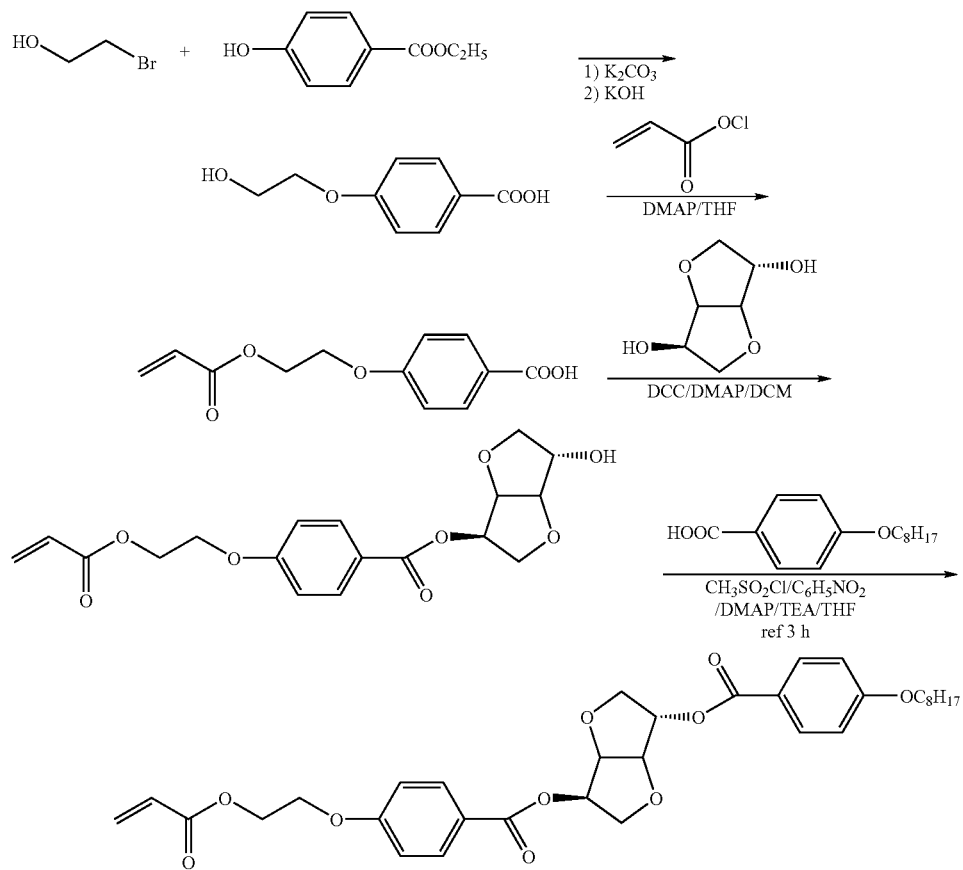
Acrylic Compound Having an Optically Active Site (2)
SYNTHESIS EXAMPLE 3
In accordance with Scheme 3 below, an acrylic compound having an optically active site (3) was synthesized. The resulting compound was refined in a hexane/ethyl acetate solvent with a silica gel chromatography.
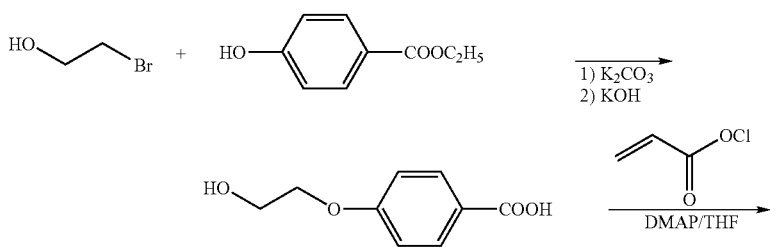

-continued
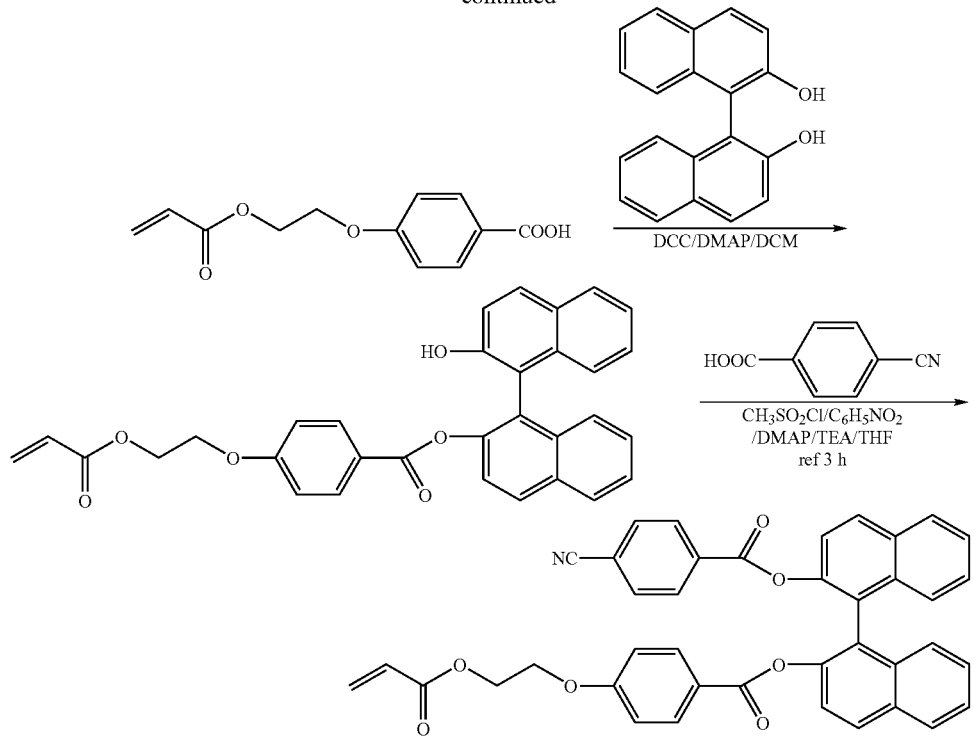
Acrylic Compound Having an Optically Active Site (3)
SYNTHESIS EXAMPLE 4
In accordance with Scheme 4 below, an acrylic compound having an oxetanyl group (4) was synthesized. The resulting compound was refined in a hexane/ethyl acetate solvent with a silica gel chromatography.
Scheme 4
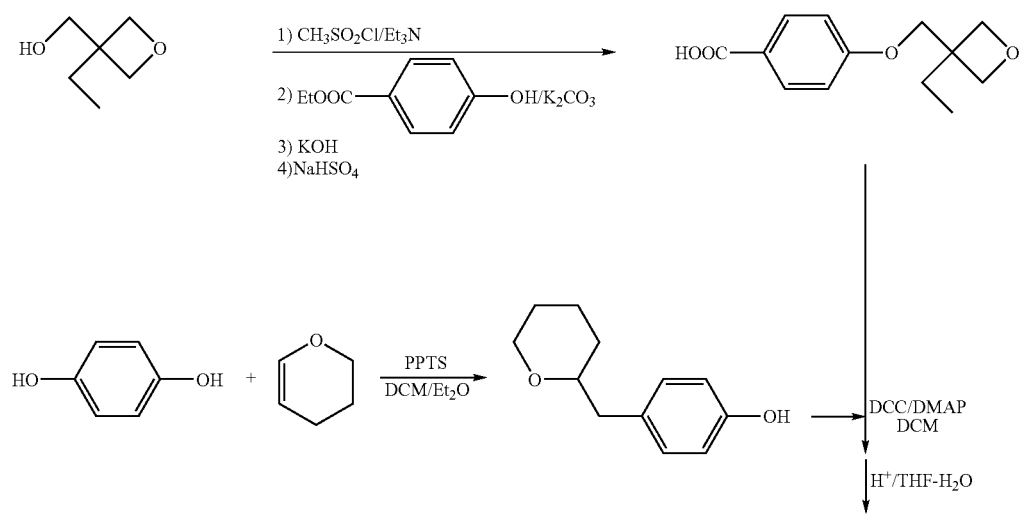

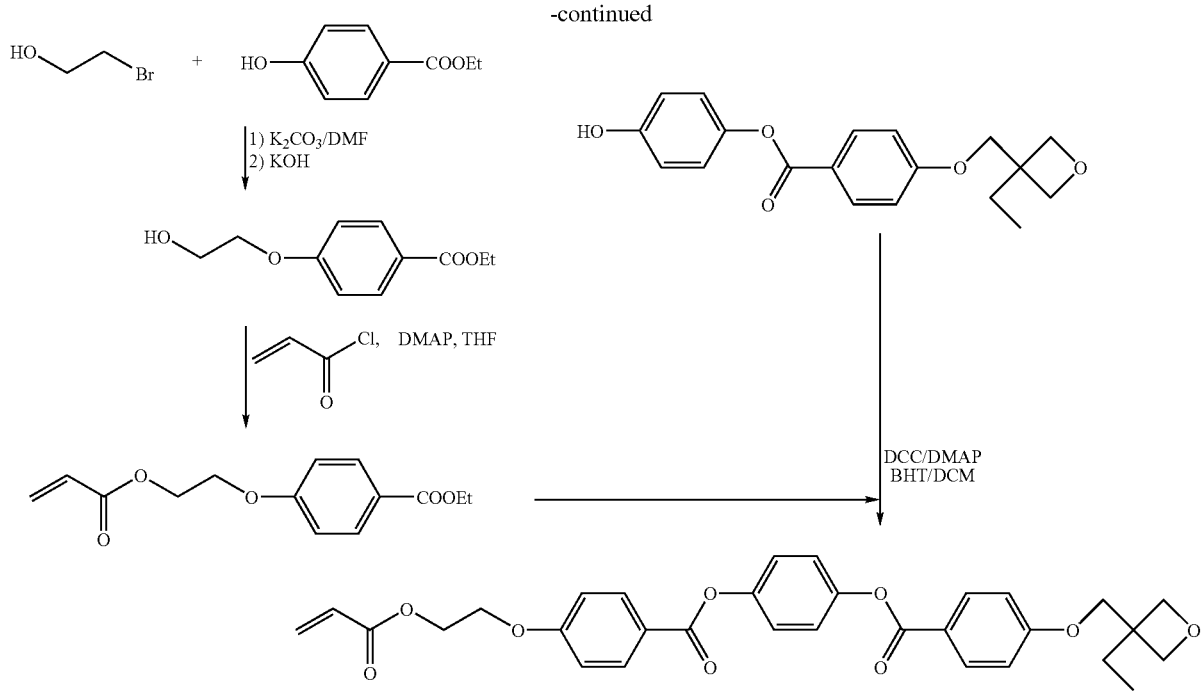
Acrylic Compound Having an Oxetanyl Group (4)
SYNTHESIS EXAMPLE 5
In accordance with Scheme 5 below, an acrylic compound having an oxetanyl group (5) was synthesized. The resulting compound was refined in a hexane/ethyl acetate solvent with a silica gel chromatography.
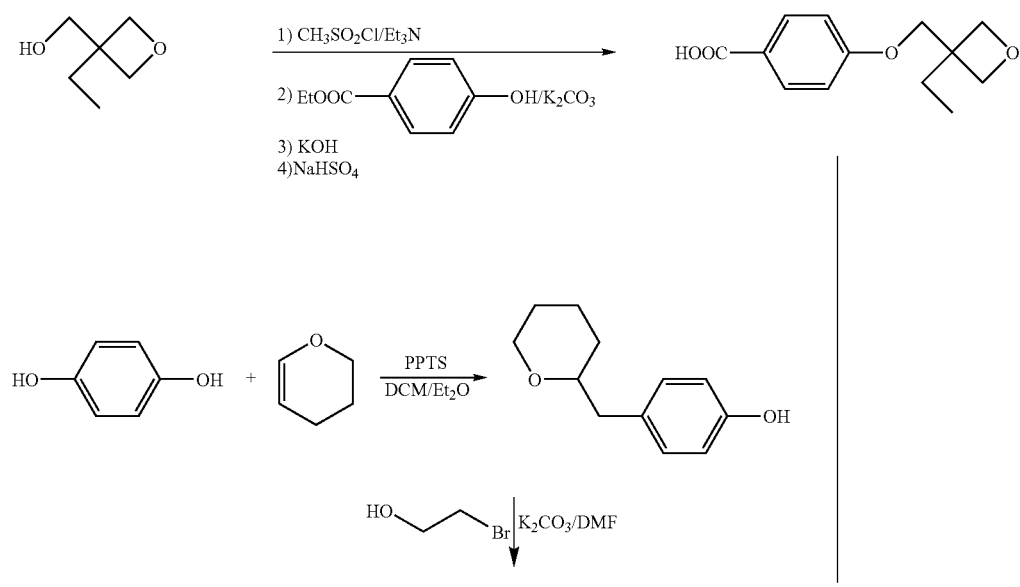
Scheme 5

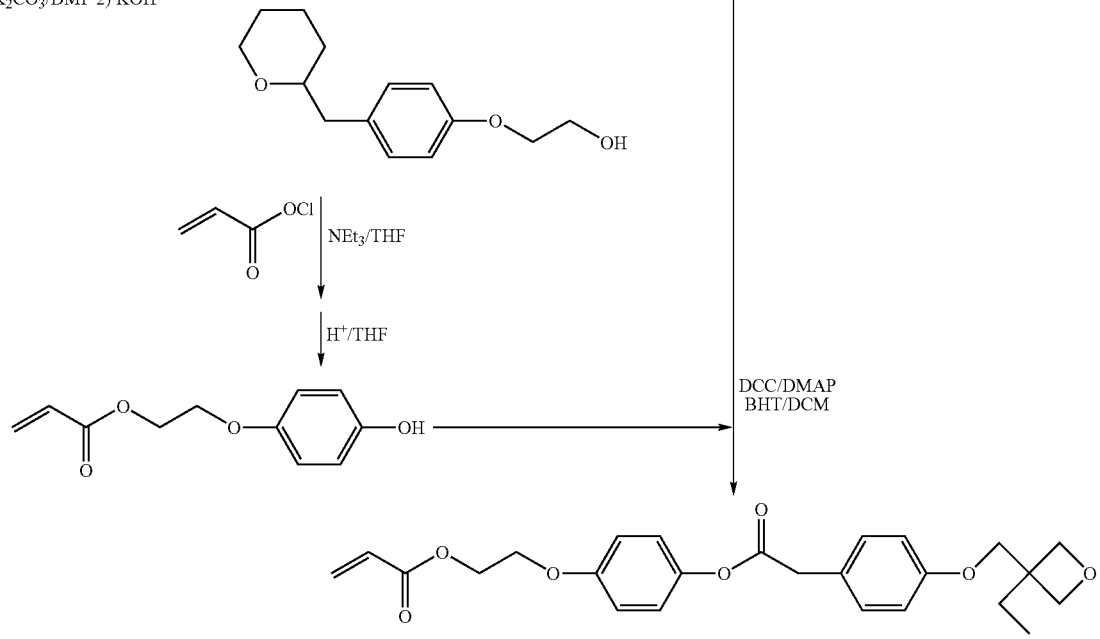

Acrylic Compound Having an Oxetanyl Group (5)

SYNTHESIS EXAMPLE 6

In accordance with Scheme 6 below, an acrylic compound having no oxetanyl group (6) was synthesized. The resulting compound was refined in a hexane/ethyl acetate solvent with a silica gel chromatography.

SYNTHESIS EXAMPLE 7

In accordance with Scheme 7 below, a compound having an oxetanyl group (7) was synthesized. The resulting compound was refined in a hexane/ethyl acetate solvent with a silica gel chromatography.

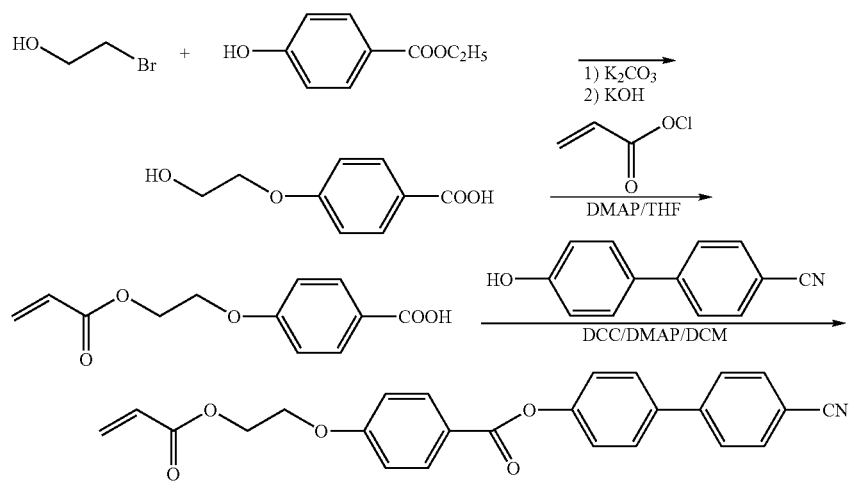

Acrylic Compound Having No Oxetanyl Group (6)

Scheme 7

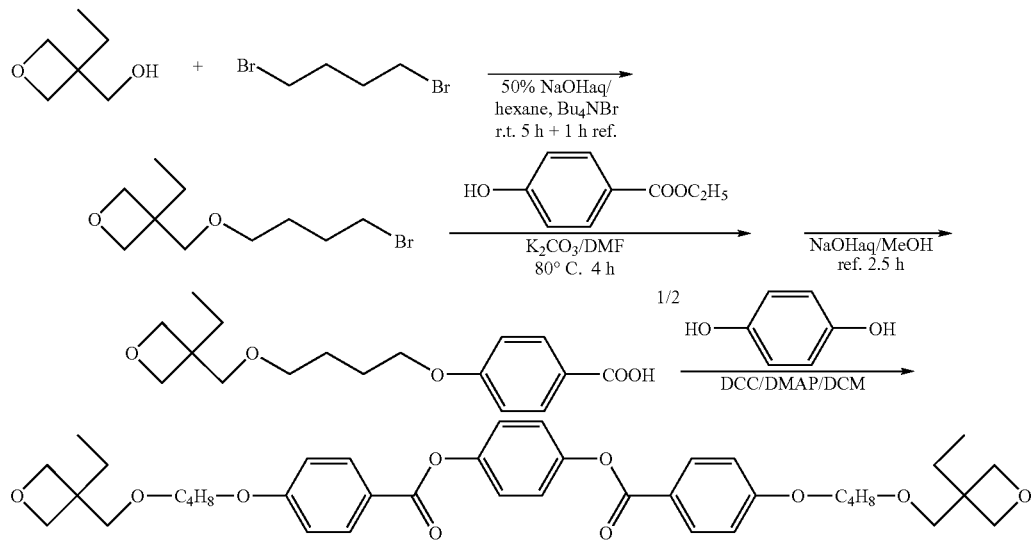

Compound Having an Oxetanyl Group (7)

SYNTHESIS EXAMPLE 8

A mixture was prepared by mixing 7 percent by weight of the acrylic compound having an optically active site (1) synthesized in Synthesis Example 1, 20 percent by weight of the acrylic compound having an oxetanyl group (4) synthesized in Synthesis Example 4, and 73 percent by weight of the acrylic compound (6) synthesized in Synthesis Example 6. The mixture was radical-polymerized using 2,2'-azobisisobutyronitrile as an initiator and DMF as a solvent under a nitrogen atmosphere at a temperature of 90° C. for 6 hours. The resulting product was reprecipitated with methanol for refining thereby synthesizing a side chain liquid crystalline polyacrylate having an oxetanyl group (8) represented by the formula below:

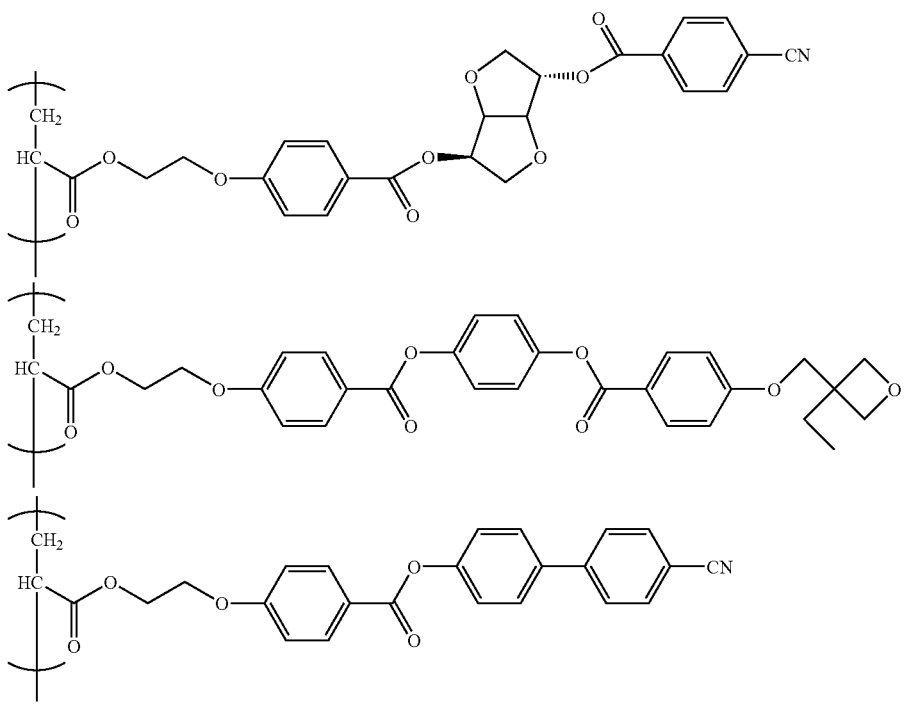

Side Chain Liquid Crystalline Polyacrylate (8)

SYNTHESIS EXAMPLE 9

A mixture was prepared by mixing 7 percent by weight of the acrylic compound having an optically active site (2) synthesized in Synthesis Example 2, 30 percent by weight of the acrylic compound having an oxetanyl group (5) synthesized in Synthesis Example 5, and 63 percent by weight of the acrylic compound (6) synthesized in Synthesis Example 6. The mixture was radical-polymerized using 2,2'-azobisisobutyronitrile as an initiator and DMF as a solvent under a nitrogen atmosphere at a temperature of 90° C. for 6 hours. The resulting product was reprecipitated with methanol for refining thereby synthesizing a side chain liquid crystalline polyacrylate having an oxetanyl group (9) represented by the formula below:

SYNTHESIS EXAMPLE 10

A mixture was prepared by mixing 15 percent by weight of the acrylic compound having an optically active site (3) synthesized in Synthesis Example 3 and 85 percent by weight of the acrylic compound having an oxetanyl group (4) synthesized in Synthesis Example 4. The mixture was radical-polymerized using 2,2'-azobisisobutyronitrile as an initiator and DMF as a solvent under a nitrogen atmosphere at a temperature of 90° C. for 6 hours. The resulting product was reprecipitated with methanol for refining thereby synthesizing a side chain liquid crystalline polyacrylate having an oxetanyl group (10) represented by the formula below:

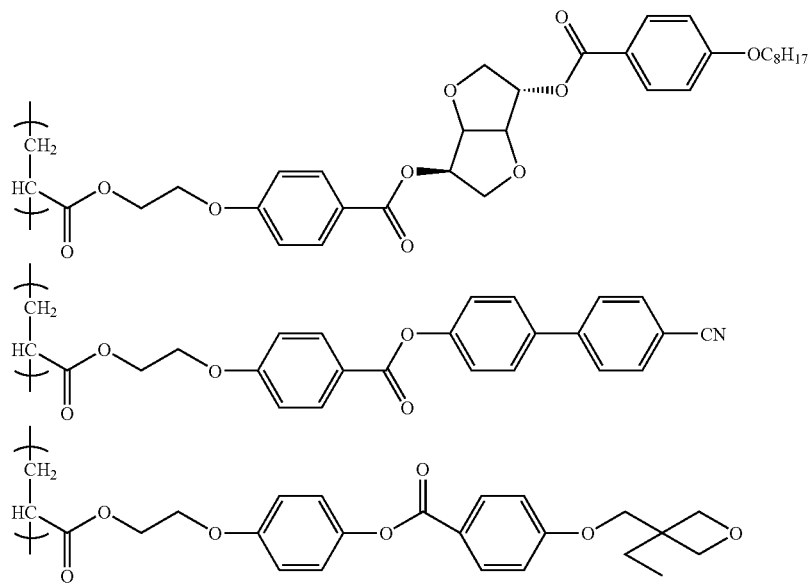

Side Chain Liquid Crystalline Polyacrylate (9)

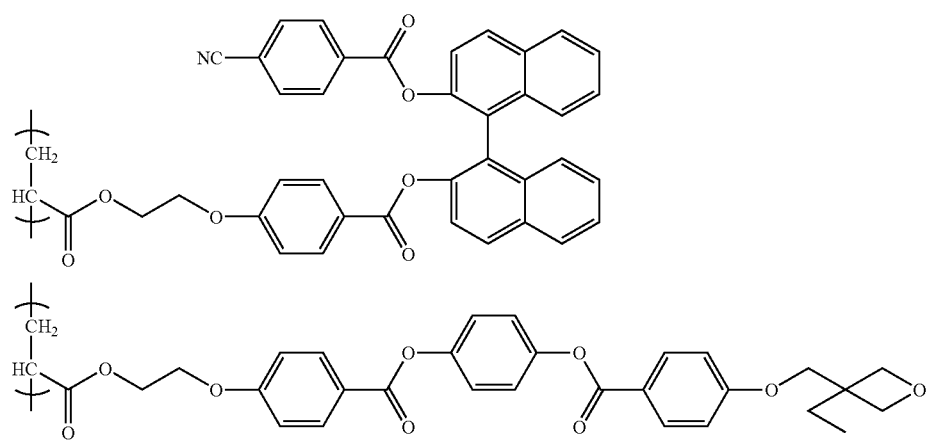

Side Chain Liquid Crystalline Polyacrylate (10)

EXAMPLE 1

In N-methyl-2-pyrrolidone were dissolved 0.80 g of the side chain liquid crystalline polyacrylate (8) synthesized in Synthesis Example 8 and 0.20 g of the oxetanyl compound (7) synthesized in Synthesis Example 7. To the solution in a dark place was added 0.1 g of a propylene carbonate solution with 50% triarylsulfoniumhexafluoroantimonate (a reagent manufactured by Aldrich Co.). The mixed solution was filtered to remove the insolubles with a polytetrafluoroethylene filter with a pore size of 0.45 μm thereby preparing a solution of a liquid crystalline composition. The resulting solution was spin-coated over a 50 μm thickness polyethylene naphthalate film (Teonex Q-51 manufactured by Teijin Dupont Films Japan Ltd.) whose surface had been subjected to a rubbing treatment with a rayon cloth and then dried on a hot plate kept at 60° C. The resulting liquid crystal composition layer on the polyethylene naphthalate film was heated at a temperature of 150° C. for 5 minutes and quenched to room temperature thereby obtaining a liquid crystal composition layer.

Since the polyethylene naphthalate film used as a substrate was large in birefringence and thus not preferable as an optical film, the film was transferred via an ultraviolet curing type adhesive (UV-1394 manufactured by Toagosei Co., Ltd.) onto a triacetylcellulose (TAC) film thereby obtaining an optical film. More specifically, the UV-1394 with a thickness of 5 μm was coated over the cured liquid crystal composition layer on the polyethylene naphthalate film and laminated with a TAC film. After the laminate was subjected to an irradiation of ultraviolet light of 300 mj/cm$^2$ from the TAC film side so as to cure the adhesive, the polyethylene naphthalate film was released.

As a result of observation of the resulting optical film through a polarizing microscope, it was confirmed that the film exhibited a monodomain uniform cholesteric orientation having no disclination. When the film was viewed from the front, it had a selective reflection light peculiar to the cholesteric orientation. When the transmittance spectrum of the optical film was evaluated through the spectroscope, a region wherein the transmitted light peculiar to the selective reflection was decreased was observed around 620 nm which is in the infrared region.

EXAMPLE 2

In triethylene glycol dimethyl ether was dissolved 1.00 g of the side chain liquid crystalline polyacrylate compound (9) synthesized in Synthesis Example 9. To the solution in a dark place was added 0.05 g of a propylene carbonate solution with 50% triarylsulfoniumhexafluoroantimonate (a reagent manufactured by Aldrich Co.). The mixed solution was filtered to remove the insolubles with a polytetrafluoroethylene filter with a pore size of 0.45 μm thereby preparing a solution of a liquid crystalline composition. The resulting solution was spin-coated over a 50 μm thickness polyethylene terephthalate film (T-60 manufactured by Toray Industries, Inc.) whose surface had been subjected to a rubbing treatment with a rayon cloth and then dried on a hot plate kept at 60° C. The resulting liquid crystal composition layer on the polyethylene terephthalate film was heated at a temperature of 140° C. for 5 minutes and quenched to room temperature thereby obtaining a liquid crystal composition layer.

Since the polyethylene terephthalate film used as a substrate was large in birefringence and thus not preferable as an optical film, the film was transferred via an ultraviolet curing type adhesive (UV-3400 manufactured by Toagosei Co., Ltd.) onto a TAC film thereby obtaining an optical film. More specifically, the UV-3400 with a thickness of 5 μm was coated over the cured liquid crystal composition layer on the polyethylene terephthalate film and laminated with a TAC film. After the laminate was subjected to an irradiation of ultraviolet light of 600 mj/cm$^2$ from the TAC film side so as to cure the adhesive, the polyethylene terephthalate film was released.

As a result of observation of the resulting optical film through a polarizing microscope, it was confirmed that the film exhibited a monodomain uniform cholesteric liquid crystal orientation having no disclination. The film had a selective reflection light peculiar to the cholesteric orientation. When the transmission spectrum of the optical film was evaluated through the spectroscope, a region wherein the transmitted light peculiar to the selective reflection was decreased was observed around 460 nm.

EXAMPLE 3

In methyl ethyl ketone was dissolved 1.00 g of the side chain liquid crystalline polyacrylate (10) synthesized in Synthesis Example 10. To the solution in a dark place were added 0.05 g of a photo curing initiator (CYRACURE UVI-6992 manufactured by DOW Chemical Company) and 0.01 g of dibutoxyanthracene (manufactured by KAWASAKI KASEI CHEMICALS LTD). The mixed solution was filtered to remove the insolubles with a polytetrafluoroethylene filter with a pore size of 0.45 μm thereby preparing a solution of a liquid crystalline composition. The resulting solution was spin-coated over a 75 μm thickness polyethylene naphthalate film (Teonex Q-51 manufactured by Teijin Dupont Films Japan Ltd.) whose surface had been subjected to a rubbing treatment with a rayon cloth and then dried on a hot plate kept at 60° C. The resulting liquid crystal composition layer on the polyethylene naphthalate film was heated at a temperature of 150° C. for 5 minutes and quenched to room temperature thereby obtaining a liquid crystal composition layer.

Since the polyethylene naphthalate film used as a substrate was large in birefringence and thus not preferable as an optical film, the film was transferred via an ultraviolet curing type adhesive (UV-1394 manufactured by Toagosei Co., Ltd.) onto a TAC film thereby obtaining an optical film. More specifically, the UV-1394 with a thickness of 5 μm was coated over the cured liquid crystal composition layer on the polyethylene naphthalate film and laminated with a TAC film. After the laminate was subjected to an irradiation of ultraviolet light of 400 mj/cm$^2$ from the TAC film side so as to cure the adhesive, the polyethylene naphthalate film was released.

As a result of observation of the resulting optical film through a polarizing microscope, it was confirmed that the film exhibited a monodomain uniform cholesteric liquid crystal orientation having no disclination. When the film was viewed from the front, it had a selective reflection light peculiar to the cholesteric orientation. When the transmittance spectrum of the optical film was evaluated through the spectroscope, a region wherein the transmitted light peculiar to the selective reflection was decreased was observed around 440 nm.

What is claimed is:

1. A polymerizable liquid crystalline composition comprising:
   (I) a side chain liquid crystalline polymer produced by radical-copolymerizing (A) a (meth)acrylic compound having an optically active portion, represented by formula (1) below and (B) a (meth)acrylic compound having an oxetanyl group represented by formula (2) below; and (II) a photo cation generator and/or a thermal cation generator, the weight ratio of Compound (A) to Compound (B) in the side chain liquid crystalline polymer (I) being within the range of 1:99 to 99:1:

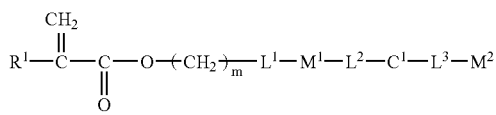  (1)

wherein $R^1$ is hydrogen or methyl, $C^1$ is an optically active site, $L^1$, $L^2$, and $L^3$ are each independently a single bond, —O—, —O—CO—, or —CO—O—, $M^1$ is represented by formula (3), (4), or (5) below, $M^2$ is represented by formula (6), (7), or (8) below, and m is an integer of 0 to 10,

—$P^1$-$L^4$-$P^2$-$L^5$-$P^3$— (3)

—$P^1$-$L^4$-$P^2$— (4)

—$P^1$— (5)

—$P^4$-$L^6$-$P^5$-$L^7$-$P^6$— (6)

—$P^4$-$L^6$-$P^6$— (7)

—$P^6$— (8)

wherein $P^1$, $P^2$, $P^3$, $P^4$ and $P^5$ are each independently a group selected from those represented by formulas (9) below,

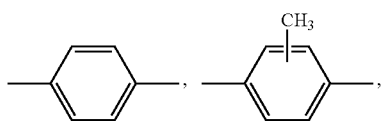 (9)

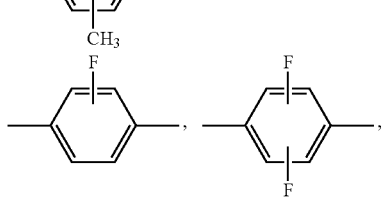

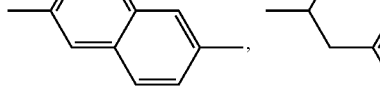

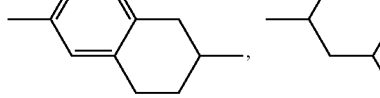

$P^6$ is a group selected from those represented by formulas (10) below,

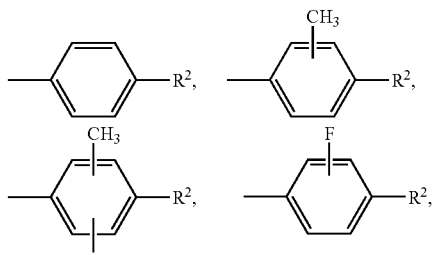 (10)

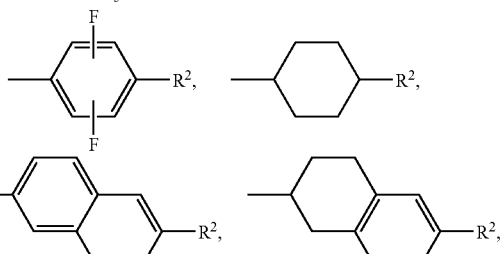

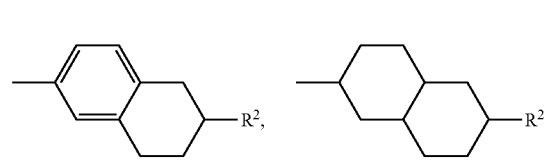

and $L^4$, $L^5$, $L^6$ and $L^7$ are each independently a single bond, —CH=CH—, —C≡C—, —O—, —O—CO— or —CO—O—, wherein $R^2$ is hydrogen, an alkyl or alkyloxy group having 1 to 20 carbon atoms, a halogen, or a cyano group;

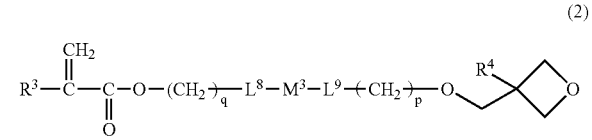 (2)

wherein $R^3$ is hydrogen or methyl, $R^4$ is hydrogen, methyl or ethyl, $L^8$ and $L^9$ are each independently a single bond, —O—, —O—CO—, or —CO—O—, $M^3$ is represented by formula (11), (12) or (13) below, and p and q are each independently an integer of 0 to 10,

—$P^7$-$L^{10}$-$P^8$-$L^{11}$-$P^9$— (11)

—$P^7$-$L^{10}$-$P^8$— (12)

—$P^7$— (13)

wherein $P^7$, $P^8$, and $P^9$ are each independently a group selected from those represented by formulas (14),

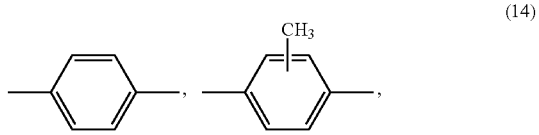 (14)

-continued

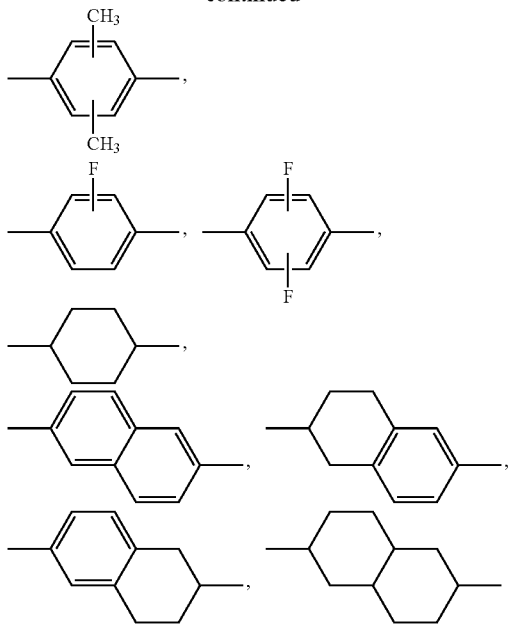

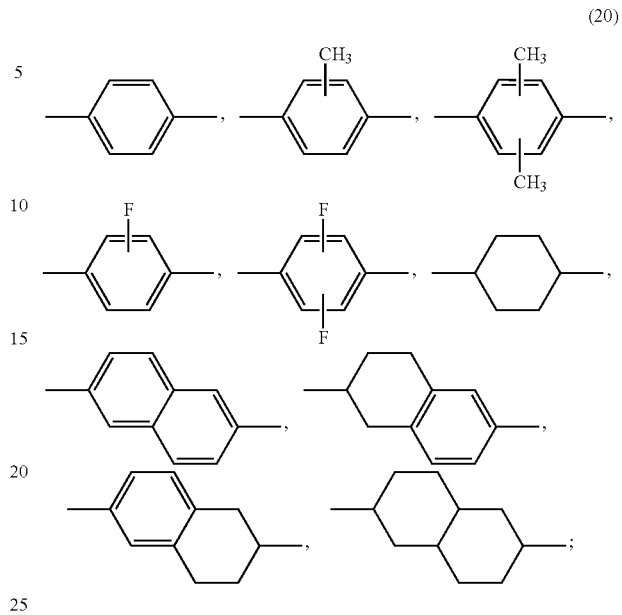

and $L^{10}$ and $L^{11}$ are each independently a single bond, —CH=CH—, —C≡C—, —O—, —O—CO— or —CO—O—.

2. A polymerizable liquid crystalline composition comprising: (III) a side chain liquid crystalline polymer produced by radical-copolymerizing (D) a (meth)acrylic compound having an optically active site, represented by formula (15) below and (E) a (meth)acrylic compound having an oxetanyl group, represented by formula (16) below; and (IV) a photo cation generator and/or a thermal cation generator, the weight ratio of Compound (D) to Compound (E) in the side chain liquid crystalline polymer (III) being within the range of 1:99 to 99:1,

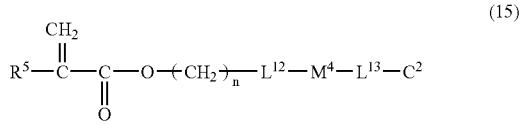     (15)

wherein $R^5$ is hydrogen or methyl, $C^2$ is an optically active site, $L^{12}$ and $L^{13}$ are each independently a single bond, —O—, —O—CO—, or —CO—O—, $M^4$ is represented by formula (17), (18) or (19) below, and n is an integer of 0 to 10,

—$P^{10}$-$L^{14}$-$P^{11}$-$L^{15}$-$P^{12}$— (17)

—$P^{10}$-$L^{14}$-$P^{11}$— (18)

—$P^{10}$— (19)

wherein $P^{10}$, $P^{11}$, and $P^{12}$ are each independently a group selected from those represented by formulas (20) below, and $L^{14}$ and $L^{15}$ are each independently a single bond, —CH=CH—, —C≡C—, —O—, —O—CO— or —CO—O—,

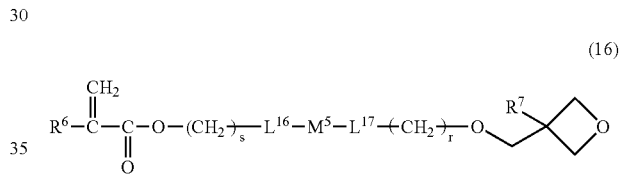     (16)

wherein $R^6$ is hydrogen or methyl, $R^7$ is hydrogen, methyl, or ethyl, $L^{16}$ and $L^{17}$ are each independently a single bond, —O—, —O—CO—, or —CO—O—, $M^5$ is represented by formula (21), (22) or (23), and r and s are each independently an integer of 0 to 10,

—$P^{13}$-$L^{18}$-$P^{14}$-$L^{19}$-$P^{15}$— (21)

—$P^{13}$-$L^{18}$-$P^{14}$— (22)

—$P^{13}$— (23)

wherein $P^{13}$, $P^{14}$, and $P^{15}$ are each independently a group selected from those represented by formulas (24) below,

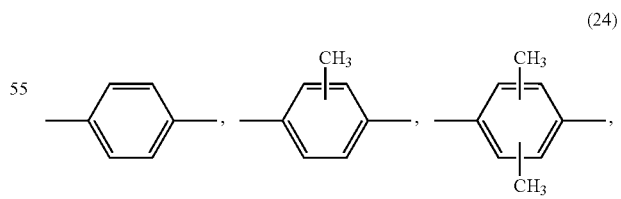     (24)

-continued

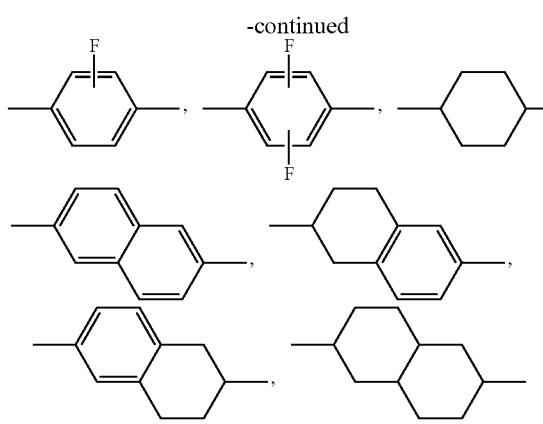

and $L^{18}$ and $L^{19}$ are each independently a single bond, —CH=CH—, —C≡C—, —O—, —O—CO— or —CO—O—.

3. The polymerizable liquid crystalline composition according to claim 1, wherein $C^1$ in formula (1) is a group represented by any one of formula (25), (26), (27), (28), or (29):

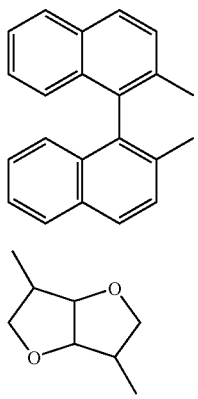 (25)

(26)

(27)

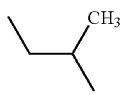 (28)

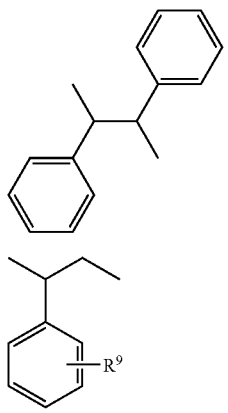 (29)

wherein $R^9$ is hydrogen, an alkyl or alkyloxy group having 1 to 20 carbon atoms, a halogen, or a cyano group.

4. The polymerizable liquid crystalline composition according to claim 2, wherein $C^2$ in formula (15) is a group represented by any one of formula (30), (31), (32), (33), or (34) below:

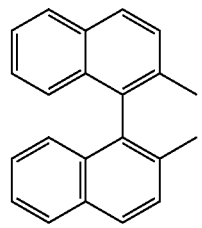 (30)

(31)

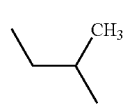 (32)

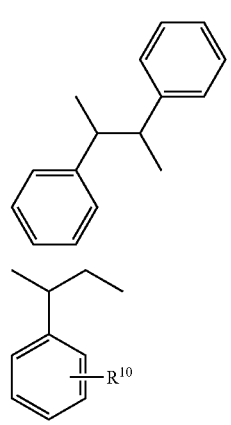 (33)

(34)

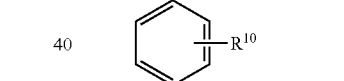

Wherein $R^{10}$ is hydrogen, an alkyl or alkyloxy group having 1 to 20 carbon atoms, a halogen, or a cyano group.

5. A liquid crystal film, comprising a layer of the polymerizable liquid crystalline composition according to claim 1, formed on an alignment film so as to align cholesterically and fix the molecules, the layer being polymerized with light and/or heat.

6. A liquid crystal film, comprising a layer of the polymerizable liquid crystalline composition according to claim 2, formed on an alignment film so as to align cholesterically and fix the molecules, the layer being polymerized with light and/or heat.

7. A liquid crystal film, comprising a layer of the polymerizable liquid crystalline composition according to claim 3, formed on an alignment film so as to align cholesterically and fix the molecules, the layer being polymerized with light and/or heat.

8. A liquid crystal film, comprising a layer of the polymerizable liquid crystalline composition according to claim 4, formed on an alignment film so as to align cholesterically and fix the molecules, the layer being polymerized with light and/or heat.

* * * * *